No. 861,682. PATENTED JULY 30, 1907.
W. SHAW.
DIE FOR CUTTING TAPERED THREADS.
APPLICATION FILED JULY 30, 1906.
2 SHEETS—SHEET 2.
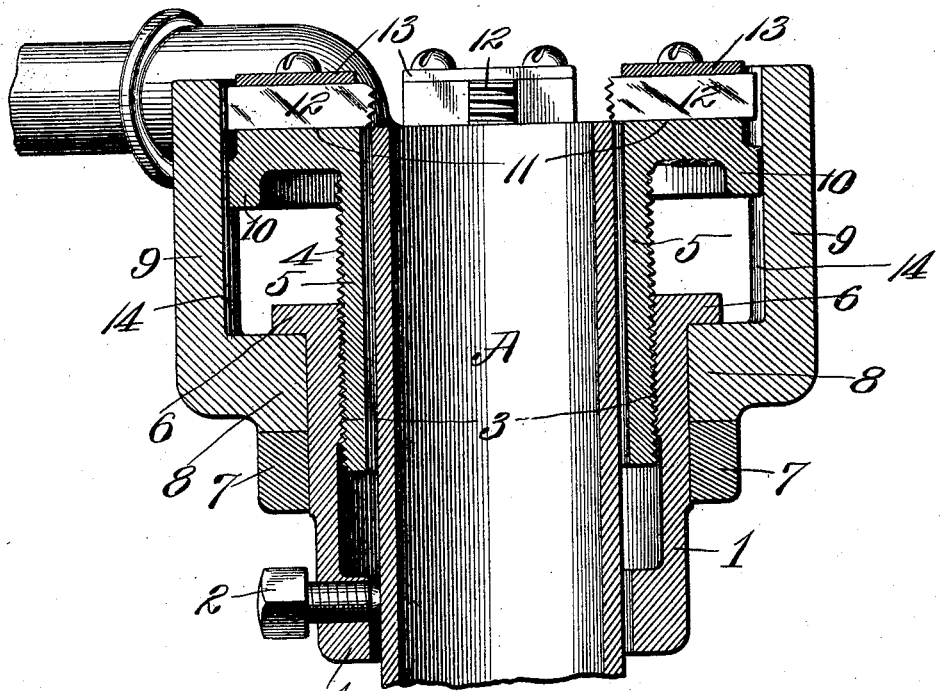
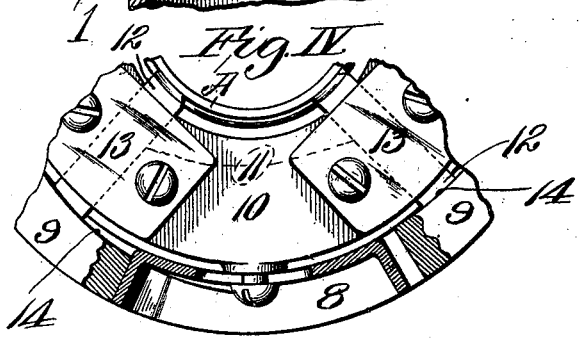
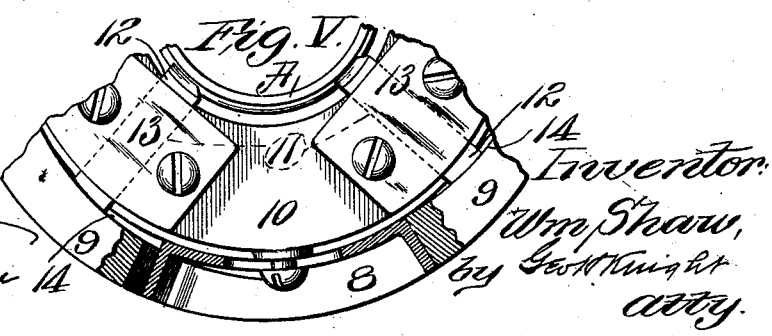

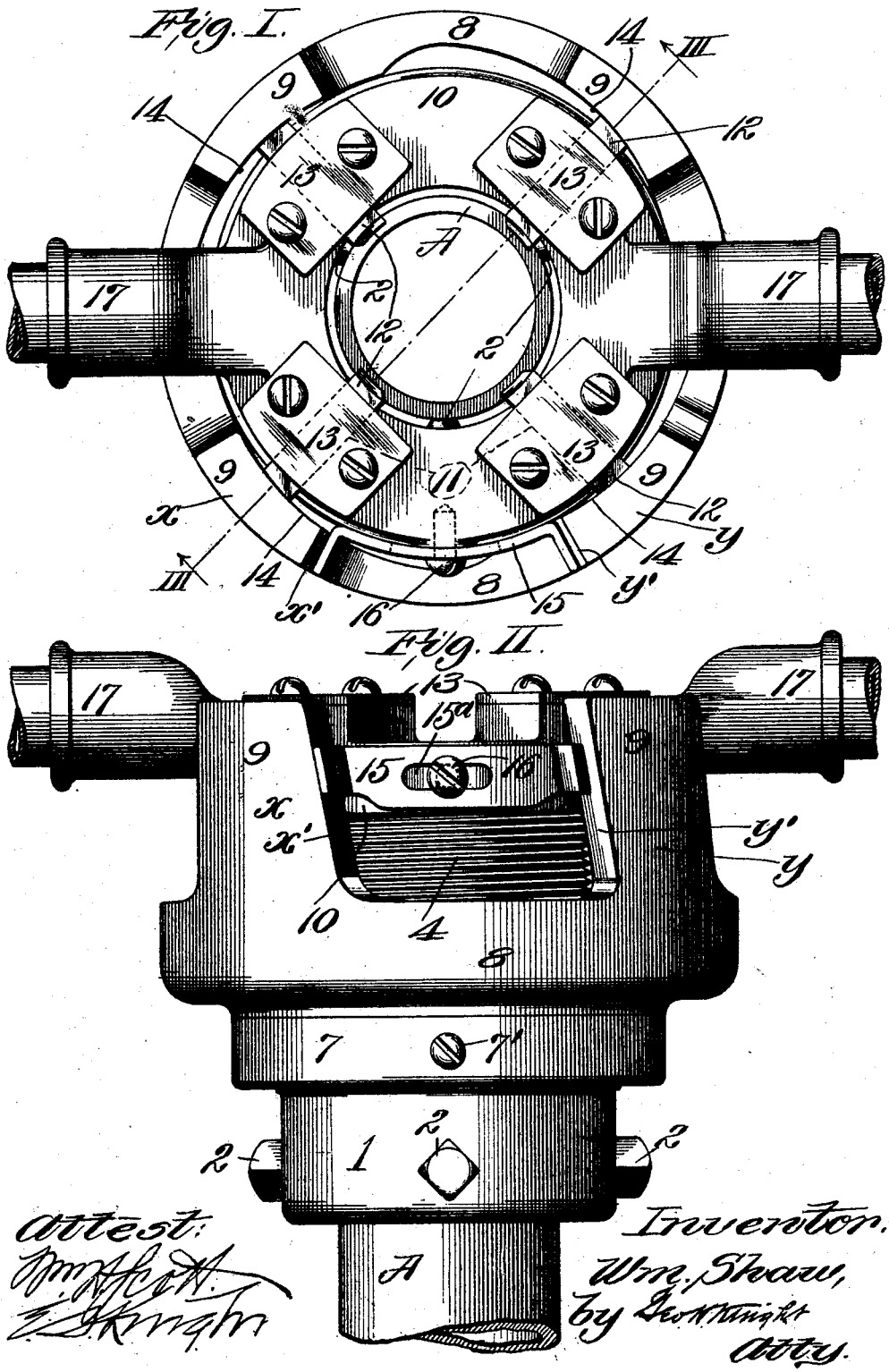

UNITED STATES PATENT OFFICE.

WILLIAM SHAW, OF EDWARDSVILLE, ILLINOIS, ASSIGNOR TO BIGNALL & KEELER MFG. COMPANY, OF EDWARDSVILLE, ILLINOIS, A CORPORATION.

DIE FOR CUTTING TAPERED THREADS.

No. 861,682.     Specification of Letters Patent.     Patented July 30, 1907.

Application filed July 30, 1906. Serial No. 328,279.

*To all whom it may concern:*

Be it known that I, WILLIAM SHAW, a citizen of the United States of America, residing in Edwardsville, in the county of Madison and State of Illinois, have invented certain new and useful Improvements in Dies for Cutting Tapered Threads, of which the following is a full, clear, and exact description, reference being had to the accompanying drawing, forming part of this specification.

This invention relates to a new and useful improvement in dies for cutting tapered threads upon pipes, etc., by the use of a plurality of dies or chasers mounted upon a revoluble head, which dies operate upon the work to be threaded.

One object of my invention is to produce a device of this character which is strong, composed of few parts so that the same can be economically manufactured and is unlikely to become out of order.

Another object of the invention is to provide means whereby, after a tapered thread has been cut upon the work to be threaded, the dies or chasers can be released from their binding tendency in the threads cut so that they can be withdrawn therefrom with little exertion on the part of the operator.

Figure I is a face view of my improved die as an entirety. Fig. II is a side elevation of the same. Fig. III is a longitudinal section taken on line III—III, Fig. I. Fig. IV is a detail view partly in section of a portion of my die and the means employed for forming the taper of the threads to be cut. Fig. V is a similar view to Fig. IV showing some of the parts in a changed position.

A represents a section of pipe upon which a tapered thread is to be cut, which pipe passes through and is secured to the work holder 1 by means of set screws 2. This work holder 1 is of a hollow cylindrical shape and is provided with an internally arranged screw thread 3 which has screw threaded engagement with an exteriorly arranged thread 4 formed on a hollow cylindrical body 5. The work holder 1 is provided upon one end with an outwardly disposed annular flange 6 and between which, and a collar 7 fastened to said work holder by a set screw 7' or any other suitable means, is revolubly mounted a ring 8 carrying posts 9, the purpose of which will hereinafter be described. Formed upon the outer end of and preferably integral with the hollow cylindrical body 5 is an annular flange or die holder 10 which is provided with a plurality of radially disposed slots or guide-ways 11, and slidably mounted in which are the dies or chasers 12, which dies or chasers are retained in the guide-ways 11 by plates 13 removably secured by screws as shown. The inner ends of the chasers are provided with the usual thread cutting threads, while the outer ends thereof extend beyond their supporting flange 10 and coöperate with eccentric faces 14 formed on the inner faces of the posts 9.

At least two of the posts 9 which I will designate by the letters $x$ and $y$ are provided with parallel inclined faces; that is, one of the faces $x'$ of the post $x$ is provided with a face arranged at an angle to the axis of the revoluble chaser holding element, while the next adjacent face of the post $y$ is formed with an inclined face $y'$ of a similar angle to the face $x'$.

Secured to the periphery of the flange 10 and located between the parallel inclined faces $x'$ and $y'$ of the posts $x$ and $y$ (posts 9) is a concentric bar of metal 15 which is somewhat shorter in length than is the distance between the inclined faces $x'$ and $y'$ and is designed to contact with the former or latter when the chaser holder is rotated in the right-hand or left-hand direction respectively and imparts motion to the ring 8 and its carried posts 9. This bar 15 is longitudinally adjustable by means of a slot $15^a$ through which its securing means, in the form of a screw 16, passes. The purpose of the adjustment of this bar 15 is to increase or diminish the distance between its ends and the dies or chasers, whereby the cutting ends of the dies or chasers will, due to their position against the eccentric faces 14 of the posts 9, be a greater or less distance in the path of the work to be threaded, whereby, upon the same work, a thread of greater or less depth can be cut.

17 indicates sockets formed on the flange 10 which are designed to receive handles by which said flange and its carried chasers or dies can be turned.

In the practical use of my invention the operation of the device is as follows: The pipe or other object to be threaded is clamped to the work holder by means of the set screws 2 with its extreme outer end in juxtaposition to the cutting inner ends of the dies or chasers, while the outer ends of said dies or chasers bear against the eccentric faces of the posts 9 of the ring 8. The die or chaser holder is then rotated in the proper direction to cut a thread, which causes the ring 8 and its carried posts 9 to also rotate, due to the contact of the bar or projection 15 with one of said posts, and due to the screw threaded engagement of the die holder with the work holder, the former is drawn inwardly and as the bar 15 which is carried by said die holder is also drawn inwardly its coöperation with the inclined face $x'$ of the post $x$ (9) causes all of the posts 9 and their supporting ring 8 to rotate at a slightly greater speed than does the die holder, whereby the dies or chasers gradually recede from a point on the eccentric faces of the posts 9 nearest the axis of the work—which position they occupy when the thread was started—to a point on said eccentric face of greater distance from the axis of the work, whereby the cutting inner ends of the dies or chasers are gradually moved from their initial position where they were cutting the maximum depth thread until they finally fail to cut a thread at all upon the work. After this tapered thread has been cut upon the work and it is desired to remove the dies therefrom, the die holder is rotated in a reverse dierction, the initial movement of which causes the bar 15, which as before stated is somewhat shorter than the distance between the faces $x'$ and $y'$ of the posts 9, to move a given distance and then contact with the inclined face $y'$ of the post $y$, whereupon retrogressive movement to the ring 8 and its carried posts is imparted. It will be understood that the movement of the bar 15 from the position that it occupied when cutting a thread to the position it occupies as just above described, permits the die holder to rotate a short distance and relieves the dies or chasers from contact with the eccentric faces of the posts 9 and permits said dies or chasers to move outwardly, whereby their binding tendency in the threads cut in the work is relieved.

I claim:

1. In a screw cutting die the combination of a work holder, a chaser holder having threaded engagement with said work holder and rotatable in relation thereto, a ring mounted for rotation on said chaser holder and prevented from endwise movement with relation to the chaser holder, and having an interior eccentric face against which a chaser carried by said chaser holder is adapted to bear so as to be forced inwardly toward the axis of the chaser holder, and engaging parts on said ring and said chaser holder so constructed and arranged that the ring is rotated in relation to the chaser holder while the chaser holder and the ring are being rotated combinedly; substantially as set forth.

2. In a screw cutting die the combination of a work holder, a chaser holder having threaded engagement with said work holder and rotatable in relation thereto, a ring mounted for rotation on said chaser holder and prevented from endwise movement with relation to the chaser holder, and having an interior eccentric face against which a chaser carried by said chaser holder is adapted to bear so as to be forced inwardly toward the axis of the chaser holder, and a face inclined to the axis of said ring, and means carried by said chaser holder adapted to ride against said inclined face so as to rotate said ring in relation to said chaser holder while said parts are rotated combinedly; substantially as set forth.

3. In a screw cutting die, the combination of a work holder, a chaser holder having threaded engagement with said work holder and rotatable relative thereto, a revoluble ring surrounding said chaser holder and prevented from endwise movement and having an eccentric face at the inside of its wall against which a chaser carried by said holder is adapted to bear and having a pair of inclined faces located parallel with each other and a bar fixed to said chaser holder and adapted to ride against either of said inclined faces to rotate said ring; said bar being shorter than the distance between said inclined faces, substantially as and for the purpose set forth.

4. In a screw cutting die, the combination of a work holder, a chaser holder having threaded engagement with said work holder and rotatable relative thereto, a revoluble ring surrounding said chaser holder and prevented from endwise movement and having an eccentric face at the inside of its wall against which a chaser carried by said holder is adapted to bear and having a pair of inclined faces located parallel with each other and a bar adjustably secured to said chaser holder and adapted to ride against either of said inclined faces to rotate said ring; substantially as set forth.

5. In a screw cutting die, the combination with a support, of a revoluble chaser carrying-element having screw threaded engagement with said support, a revoluble ring mounted upon said support and provided with inwardly disposed eccentric faces for coöperation with chasers carried by said revoluble element; said chaser supporting element and revoluble ring being provided with engaging parts constructed and arranged to cause rotative movement of said ring at a different speed from that of the chaser carrying element as the latter is rotated, substantially as set forth.

WILLIAM SHAW.

In presence of—
E. S. KNIGHT,
BLANCHE HOGAN.